(12) United States Patent
Hemiari et al.

(10) Patent No.: US 6,928,189 B2
(45) Date of Patent: Aug. 9, 2005

(54) AUTOMATIC EXTRACTION OF LINEAR FEATURES FROM DIGITAL IMAGERY

(75) Inventors: Gholamabbas Hemiari, Sherbrooke (CA); Denis Morin, Sherbrooke (CA); Dong-Chen He, Sherbrooke (CA)

(73) Assignee: Niversite de Sherbrooke, Sherbrooke (CA)

( * ) Notice: Subject to any disclaimer, the term of this patent is extended or adjusted under 35 U.S.C. 154(b) by 744 days.

(21) Appl. No.: 09/900,886

(22) Filed: Jul. 10, 2001

(65) Prior Publication Data

US 2002/0028019 A1 Mar. 7, 2002

(30) Foreign Application Priority Data

Jul. 11, 2000 (CA) .............................................. 2313803

(51) Int. Cl.[7] ................................................ G06K 9/46
(52) U.S. Cl. ....................... 382/190; 345/443; 345/545; 382/125; 382/159; 382/281; 382/302; 382/305; 707/2; 707/4; 707/101; 707/104.1
(58) Field of Search ................................ 345/418, 441, 345/443, 543, 545; 382/118, 147, 151, 159, 203, 199, 224, 276, 281, 190, 124, 125, 202, 258, 280, 305; 707/4, 100, 101, 104.1

(56) References Cited

U.S. PATENT DOCUMENTS

| | | | | |
|---|---|---|---|---|
| 5,418,892 A | * | 5/1995 | Aghajan et al. | ............ 345/418 |
| 5,561,718 A | * | 10/1996 | Trew et al. | ................. 382/118 |
| 5,638,465 A | * | 6/1997 | Sano et al. | .................. 382/281 |
| 6,259,809 B1 | * | 7/2001 | Maruo | ......................... 382/151 |
| 6,529,916 B2 | * | 3/2003 | Bergman et al. | .......... 707/104.1 |
| 6,597,800 B1 | * | 7/2003 | Murray et al. | .............. 382/103 |

* cited by examiner

Primary Examiner—Bhavesh M. Mehta
Assistant Examiner—Gregory Desire
(74) Attorney, Agent, or Firm—Goudreau Gage Dubuc (57) ABSTRACT

A method and system for the extraction of linear features from digital imagery is described herein. The proposed methodology is based on the tridimensional Radon transformation and on the generation of a multi-layer database having separate layers containing different types of information to allow the reconstruction of an output image where the linear features of the input image are restored.

9 Claims, 6 Drawing Sheets

AUTOMATIC EXTRACTION OF LINEAR FEATURES FROM DIGITAL IMAGERY

FIELD OF THE INVENTION

The present invention relates to digital imagery. More specifically, the present invention is concerned with a system and a method for the automatic extraction of linear features from digital imagery.

BACKGROUND OF THE INVENTION

With the recent, rapid development of computer tools, digital image processing has become an efficient, economic, and convenient means for obtaining qualitative and quantitative information in different fields such as remote sensing, cartography, robotics, and materials.

Indeed, digital image processing makes it possible to qualitatively describe images from various sources in terms of pattern recognition to identify and isolate contained objects. One of the major subclasses of contained objects present in digital images consists in linear features. Automatic detection of linear features from digital images plays an important role in pattern recognition and in digital image processing.

A variety of techniques and many algorithms have emerged to automatically extract linear features from digital images. These techniques can be classified into two main categories: local methods which are based on local operators such as mobile kernel, and global methods which focus on mathematical transformations, such as Hough transforms (see [1]).

Local methods for automatically extracting linear features basically exploit local variations of pixel intensity in a small neighborhood by calculating the gradients in small, limited-size windows in the image, e.g., 3×3 pixels or 5×5 pixels (see [2][3][4][5][6][7][8][9]).

A number of researchers have examined mathematical morphology as a means of extracting linear features (see [10][11][12][13][14]). The problems pertaining to this technique arise from the number of human decisions required to reconnect and rebuild line segments, which increases processing time. Multi-dimensional line detection is the other technique for detecting for linear features that collects different spectral information for the same scene and may highlight different parts of lines (see [15]). The first stage of this method for obtaining the combined images requires several transformations of multiple original bands. Human intervention is needed to select the best-combined image. Another approach to linear-feature extraction involves knowledge-based systems, which need more information than a simple digital image for line extraction (see [16][17][18]).

These local methods generally remain inefficient because they fail to have a global view of the linear features in a digital image. One problem common to all of these methods is that the resulting extracted line images contain a fair amount of noise, while the detected lines are often incomplete and geometrically shifted. These difficulties are magnified by intersections between different linear features and linear features that display some curvature (see [19][20][1]). In addition, these methods turn in exceptionally long processing time when extracting features from large images (see [16]).

Of the local methods, LINDA (Linear-featured Network Detection and Analysis) system (see [2][7][27]), based on the profile intensity analysis of the pixel line, is the most recent and the most representative method. With all of basic disadvantages of the local methods, the LINDA system is far from being operational with respect to systematically and automatically processing a large set of images.

The Radon transform and its derivative, the Hough transform, are the most frequently used approaches as global methods for detecting linear features (see [21][22][23][24]). In principle, a straight line from the input image is transformed into a digital peak (a light or dark pixel, compared to its neighborhood) in the transformed plane. In this case, it is easier to detect a peak in the transformed plane than a straight line in the input image. There are three basic limitations for these methods that unfortunately restrict their applications and their utility in practice.

First, the Hough and Radon transform-based methods are limited solely to extracting straight lines (see [21]). Therefore, linear features that span the entire image but display some curvature may not produce suitable peaks or troughs in the transform plane. This restriction is linked directly to the basic definition of the method.

Secondly, there are false peaks or virtual maxima (peaks that do not represent the real line on the input image) in the transformed plane. These false peaks considerably decrease the quality of the results by increasing the error of commission. When the line density in the input image is high, eliminating the false peaks from transformed plane seriously limits these methods.

The last methodological inconvenience of these approaches is the ignorance of the nature of the detected lines. Indeed, since the intensity integration in the transformation process is performed over the entire length of the image, the process can have difficulty detecting line segments that are significantly shorter than the image dimensions (see [21][25][26]). Neither can it provide information about the positions of the endpoints of these shorter line segments or line length.

It is to be noted that the present description refers to a number of documents indicated in brackets, that are listed hereinbelow, the content of these documents is herein incorporated by reference in their entirety.

OBJECTS OF THE INVENTION

An object of the present invention is therefore to provide an improved system and method for the automatic extraction of linear features from digital imagery.

SUMMARY OF THE INVENTION

More specifically, in accordance with the present invention, there is provided a method for the extraction of linear features from digital imagery comprising the steps of:

providing a digital image;

providing a multi-layer database initializing a parameter domain;

successively applying the Radon transform on each position in the parameter domain;

for each position in the parameter domain:
    finding the coordinates of the nearest pixel in the digital image;
    determining the numerical value of the found pixel; and
    populating the layers of the provided database in accordance with the determined numerical value of the found pixel;

analysing the data of the database; and generating an output image by restoring the lines detected in the analysing step.

According to another aspect of the present invention, there is provided a system for the extraction of linear features from a digital image and for generating a corresponding output image comprising:

a controller provided with an input designed to receive a digital image and an output designed to provide a corresponding output image; said controller containing a multi-layer database; said controller being so configured as to:

initialize the discrete parameter domain;

successively apply a Radon transform on each position in the parameter domain;

for each position in the parameter domain:
find the coordinates of the nearest pixel in the digital image;
determine the numerical value of the found pixel; and
populate the layers of the provided database in accordance with the determined numerical value of the found pixel;

analyse the data of the database; and generate an output image by restoring the lines detected in the analysing step.

It is to be noted that the expression "linear features" used herein and in the appended claims is to be construed as referring both to curved lines as well as straight lines.

Other objects, advantages and features of the present invention will become more apparent upon reading of the following non-restrictive description of preferred embodiments thereof, given by way of example only with reference to the accompanying drawings.

DESCRIPTION OF THE PREFERRED EMBODIMENT

The proposed methodology generally derives from the Radon transform, yet has none of its basic disadvantages mentioned hereinabove. This methodology also builds on a solid mathematical base that demonstrates the conceptual feasibility of the new method mathematically. An algorithm has also been developed and implemented in order to achieve a concrete realization of the innovative method in a real context.

Generally stated, the proposed methodology is based on the tridimensional Radon transformation and on the generation of a multi-layer database having separate layers containing different types of information to allow the reconstruction of an output image where the linear features of the input image are restored.

In following subsections, the mathematical base as well as general procedures for an algorithmic development of an embodiment of the method and system of the present invention will be presented in details.

Mathematical Development

Continuous Function

Let $g(x,y)$ be a continuous signal of the continuous variables x and y and let $\xi$ denote a $\eta$-dimensional parameter vector defined as:

$$\xi = (\xi_1, \xi_2, \xi_3 \ldots, \xi_i, \ldots \xi_\eta) \qquad (1)$$

where $\xi$ spans the parameter domain.

For a two-dimensional continuous function, the parameter vector can be defined as:

$$\xi = (\xi_1, \xi_2, \xi_3) \; \eta = 3 \qquad (2)$$

or:

$$\xi = (\alpha, \beta, \gamma) \qquad (3)$$

hence:

$$g(x,y) = \phi(x,y;\xi) = y - \alpha x^2 - \beta x - \gamma + tm \qquad (4)$$

The Radon transform $\check{g}(\xi)$ of function $g(x,y)$ is defined as:

$$\check{g}(\xi) = \int_{-\infty}^{\infty}\int_{-\infty}^{\infty} g(x,y)\delta(\phi(x,y;\xi))dxdy \qquad (5)$$

where $\delta(.)$ denotes the Dirac delta function.

Using the definition (5) of Radon transform, curves expressed by the next parameter form can be detected:

$$\phi(x,y;\xi) = 0 \qquad (6)$$

Substituting the relation (4) into equation (5), we find:

$$\check{g}(\alpha, \beta, \gamma) = \int_{-\infty}^{\infty}\int_{-\infty}^{\infty} g(x,y)\delta(y - \alpha x^2 - \beta x - \gamma)dxdy \qquad (7)$$

where $y = \phi(x;\xi)$ represent the transformation curve.

Using proprieties of delta function, equation (7) becomes:

$$\check{g}(\alpha, \beta, \gamma) = \int_{-\infty}^{\infty}\int_{-\infty}^{\infty} g(x,y)\delta(y - \alpha x^2 - \beta x - \gamma)dxdy \qquad (8)$$

$$= \int_{-\infty}^{\infty} g(x, \alpha x^2 + \beta x + \gamma)dx$$

At this stage, the transformation curve is defined as a polynomial function of second degree using the delta function as below:

$$g(x,y) = \delta(y - \phi(x;\xi^*)) \qquad (9)$$

where the parameter vector of this curve is:

$$\xi^* = (\alpha^*, \beta^*, \gamma^*) \quad (10)$$

Using equations (4), (9) and (10), we find:

$$g(x,y) = \delta(y - (\alpha^* x^2 + \beta^* x + \gamma^*)) \quad (11)$$

According to definition of the Radon transform:

$$\check{g}(\xi) = \int_{-\infty}^{\infty} \delta(\phi(x;\xi) - \phi(x;\xi^*)) dx \quad (12)$$

$$= \int_{-\infty}^{\infty} \sum_{i=1}^{I} \frac{\delta(x - x_i)}{\left| \frac{\partial \phi(x;\xi)}{\partial x} - \frac{\partial \phi(x;\xi^*)}{\partial x} \right|} dx$$

$$= \sum_{i=1}^{I} \frac{1}{\left| \frac{\partial \phi(x_i;\xi)}{\partial x} - \frac{\partial \phi(x_i;\xi^*)}{\partial x} \right|}$$

Substitution of parameter vectors (3) and (10) into the transform definition (12) gives:

$$\check{g}(\alpha, \beta, \gamma) = \int_{-\infty}^{\infty} \delta((\alpha x^2 + \beta x + \gamma) - (\alpha^* x^2 + \beta^* x + \gamma^*)) dx \quad (13)$$

$$= \int_{-\infty}^{\infty} \sum_{i=1}^{1} \frac{\delta(x - x_i)}{\left| \frac{\partial(\alpha x^2 + \beta x + \gamma)}{\partial x} - \frac{\partial(\alpha^* x^2 + \beta^* x + \gamma^*)}{\partial x} \right|} dx$$

$$= \frac{1}{\left| \frac{\partial(\alpha x^2 + \beta x + \gamma)}{\partial x} - \frac{\partial(\alpha^* x^2 + \beta^* x + \gamma^*)}{\partial x} \right|}$$

Finally, we find:

$$\check{g}(\alpha, \beta, \gamma) = \infty \quad \text{for } \alpha = \alpha^* \text{ et } \beta = \beta^* \text{ et } \gamma = \gamma^* \quad (14)$$

$$0 < \check{g}(\alpha, \beta, \gamma) < \infty \quad \text{for other cases}$$

Equation (14) shows that the Radon transform of a polynomial function of second degree will give an infinite value (a peak) in the parameter domain, when parameters of this function are precisely determined. In addition, this equation confirms that the parameter domain will contain some other non-zero values because of parameters values which have some similarity with real parameter values of the polynomial function in question.

In the light of the mathematical demonstration presented above, tree important issues are concluded:
i) The Radon transform of a two-dimensional plane containing a polynomial function of second degree is a Euclidean tree-dimensional space;
ii) this polynomial function is mapped into a unique point in the tree-dimensional space;
iii) position of this point in the tree-dimensional space determines the polynomial function parameters.

The following subsection provides a discrete approximation to the Radon transform for a polynomial function of second degree. This discrete approximation is the key of the algorithmic development of the polynomial function in question.

Discrete Function

Discrete Radon transform of a discrete function $\phi(m;l,k,h)$ is defined as:

$$\check{g}(l, k, h) = \sum_{m=0}^{M-1} g(m, \phi(m; l, k, h)) = \sum_{m=0}^{M-1} g(m, n(m; l, k, h)) \quad (15)$$

where:

$$\phi(m; l, k, h) = n = \left[ \frac{\phi(x_{\min} + m\Delta x; \theta(l, k, h) - y_{\min})}{\Delta y} \right] \quad (16)$$

and $$\begin{cases} x_m = x_{\min} + m\Delta x & m = 0, 1, \ldots, M \\ y_n = y_{\min} + n\Delta y & n = 0, 1, \ldots, N \end{cases} \quad (17)$$

where M and N are the discrete plane dimensions and $\Delta x$, $\Delta y$ are sampling intervals of this plane.

For a polynomial function of second degree expressed as $y - \epsilon x^2 - \rho x - \tau = 0$, the Radon transform is:

$$\check{g}(l, k, h) = \Delta x \sum_{m=0}^{M-1} g(x_m, \varepsilon_l x_m^2 + \rho_k x_m + \tau_h) \quad (18)$$

with:

$$\begin{cases} \varepsilon_l = \varepsilon_{\min} + l\Delta \varepsilon & l = 0, 1, \ldots, L \\ \rho_k = \rho_{\min} + k\Delta \rho & k = 0, 1, \ldots, K \\ \tau_h = \tau_{\min} + h\Delta \tau & h = 0, 1, \ldots, H \end{cases} \quad (19)$$

where L, K and H represent dimensions of Radon domain and $\Delta \epsilon$, $\Delta \rho$ and $\Delta \tau$ are sampling intervals of this domain.

Using relation (19), the function n(m;l,k,h) of relation (16) becomes:

$$n(m; 1, k, h) = \left[ \frac{\varepsilon_l x_m^2 + \rho_k x_m + \tau_h - y_{\min}}{\Delta y} \right] \quad (20)$$

With substituting the relation (17) in the previous equation, we find:

$$n(m; l, k, h) = \left[ \frac{\varepsilon_l (x_{\min} + m\Delta x)^2 + \rho_k (x_{\min} + m\Delta x) + \tau_h - y_{\min}}{\Delta y} \right] = n^* \quad (21)$$

For simplifying, the previous equation can be expressed as:

$$n^* = \alpha m^2 + \beta m + \gamma \quad (22)$$

where:

$$\begin{cases} \alpha = \frac{\varepsilon_l \Delta x^2}{\Delta y} \\ \beta = \frac{(2 x_{\min} \varepsilon_l + \rho_k) \Delta x}{\Delta y} \\ \gamma = \frac{\varepsilon_l x_{\min}^2 + \rho_k x_{\min} + \tau_h - y_{\min}}{\Delta y} \end{cases} \quad (23)$$

According to the equation (19), once the Radon domain parameters has been initialized, using equations (21), (22) and (23) this domain is determined for all of two-dimensional plane points (X,Y).

Algorithmic Development

Figure 1A:
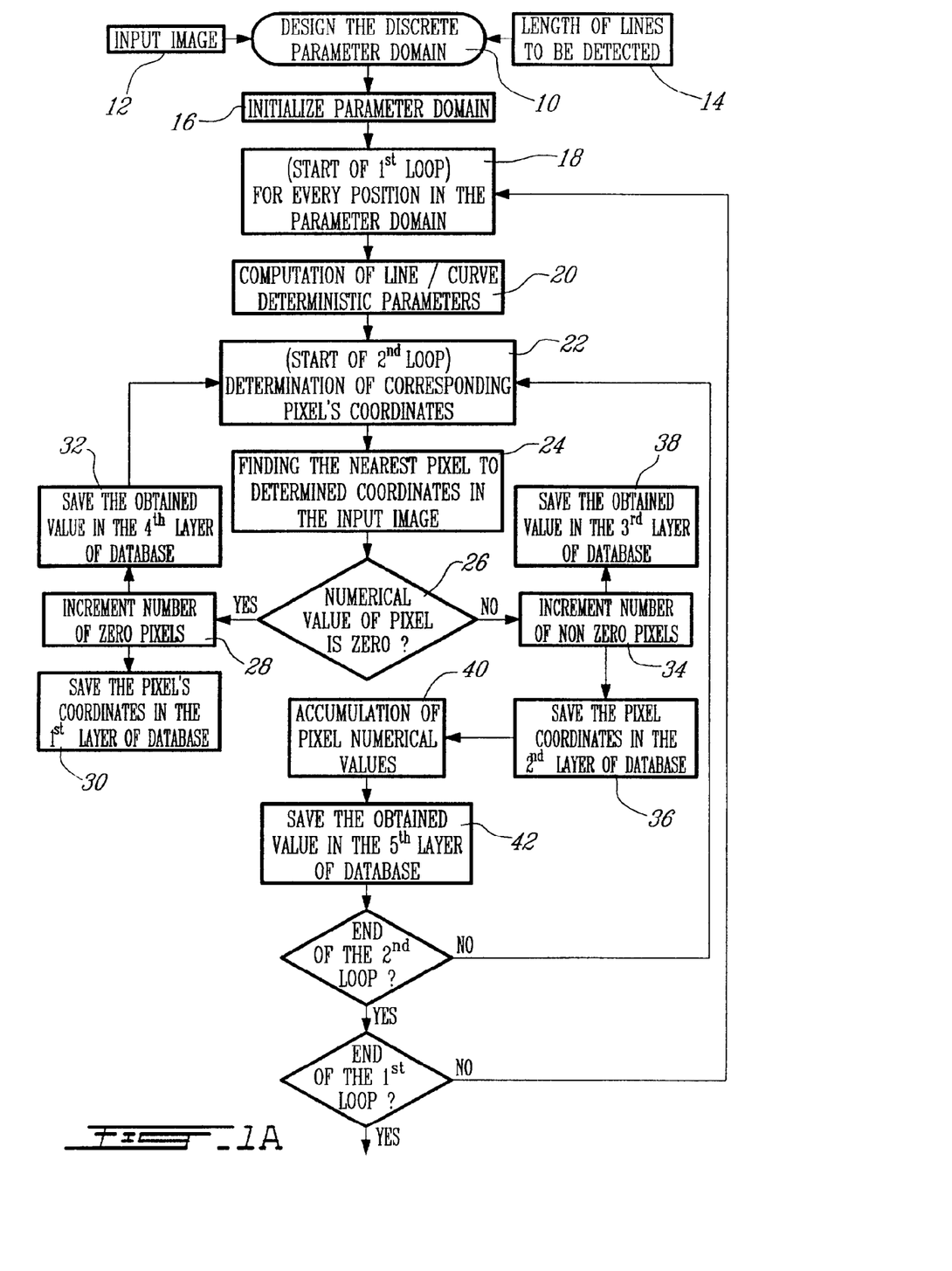
FIGS. 1A and 1B illustrate a flowchart of an embodiment of the method of the present invention.
Figure 1B:
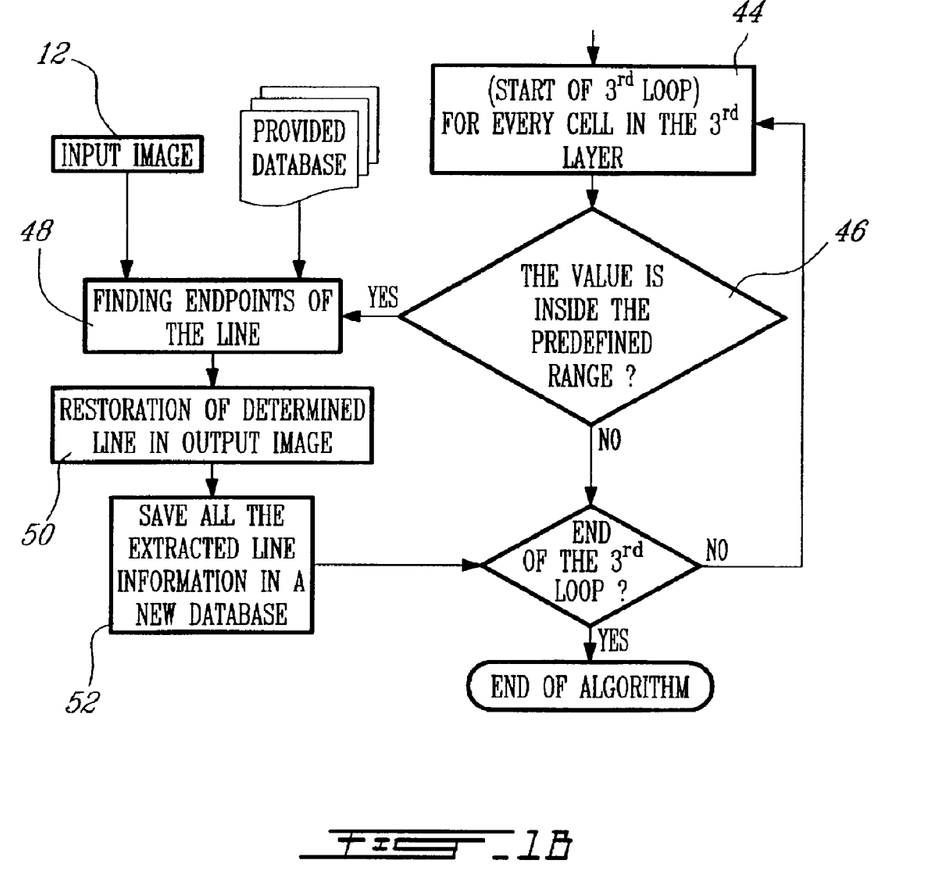

The concrete achievement of the proposed method is schematized in a flowchart presented in FIGS. 1A and 1B. This flowchart illustrates also the instructions for an algorithmic development of the proposed technology.

As will easily be understood by one skilled in the art, the algorithm presented hereinbelow aims at building a multi-layer database. A first layer of the database includes the coordinates of pixels having a zero value and a second layer includes the coordinates of the pixels having a non-zero value. A third layer of the database includes the values of the pixels having a non-zero value while the fourth layer of the database includes the value of the pixel having a zero value. Finally, a fifth layer of the database includes the sum of the values of the non-zero value pixels.

In a first step 10, the digital image 12 and the minimun and maximum lengths (in pixels) of lines to be detected 14 are supplied to design the discrete parameter domain. The parameter vector of the transformation is defined in this step as described in equations (1), (2) and (3) hereinabove.

$$\xi = (\xi_1, \xi_2, \xi_3 \ldots, \xi_i, \ldots \xi_\eta) \quad (1)$$

$$\xi = (\xi_1, \xi_2, \xi_3) \; \eta = 3 \quad (2)$$

$$\xi = (\alpha, \beta, \gamma) \quad (3)$$

A second step 16 consists in the initialization of the numerical values of discrete parameters $\epsilon_{min}$, $\Delta\epsilon$, $\rho_{min}$, $\Delta\rho$, $\iota_{min}$, $\Delta\iota$, L, K et H, as described in equation (19) and of $x_m$, $y_n$, $\Delta x$, $\Delta y$, as described in equation (17) (M and N corresponding to the dimension of digital input image).

$$\begin{cases} x_m = x_{min} + m\Delta x & m = 0, 1, \cdots, M \\ y_n = y_{min} + n\Delta y & n = 0, 1, \cdots, N \end{cases} \quad (17)$$

$$\begin{cases} \varepsilon_l = \varepsilon_{min} + l\Delta\varepsilon & l = 0, 1, \cdots, L \\ \rho_k = \rho_{min} + k\Delta\rho & k = 0, 1, \cdots, K \\ \tau_h = \tau_{min} + h\Delta\tau & h = 0, 1, \cdots, H \end{cases} \quad (19)$$

In a third step 18, a first loop is started. This first loop intends, for every position in the parameter domain, to determine every possible combination of $\epsilon_l$, $\rho_k$ and $\iota_h$ as described in equation (19) by incrementing tree values of l, k and h (0<l<L; 0<k<K; and 0<h<H). This first loop includes a second loop as will be discussed hereinbelow.

For each position in the parameter domain, a computation step 20 is performed. More specifically, the computation step 20 consists in a computation of line/curve deterministic parameters. In this step, the deterministic parameters $\alpha$, $\beta$ and $\gamma$ are computed by using equation (23).

$$\begin{cases} \alpha = \dfrac{\varepsilon_l \Delta x^2}{\Delta y} \\ \beta = \dfrac{(2x_{min}\varepsilon_l + \rho_k)\Delta x}{\Delta y} \\ \gamma = \dfrac{\varepsilon_l x_{min}^2 + \rho_k x_{min} + \tau_h - y_{min}}{\Delta y} \end{cases} \quad (23)$$

In step 22, a second loop is started. This second loop generally consists in the determination of corresponding pixel's coordinates and in the update of the various layers of the database described hereinabove. In this second loop, for each value of m (0<m<M), a new parameter n* is computed by using equation (21).

$$n(m; l, k, h) = \left[ \dfrac{\varepsilon_l (x_{min} + m\Delta x)^2 + \rho_k(x_{min} + m\Delta x) + \tau_h - y_{min}}{\Delta y} \right] = n^* \quad (21)$$

In the next step 24, the determined coordinates (m,n*) of the previous step are used to find the nearest neighbour approximation pixel P(m, n) within the input image.

Then, step 26 determines if the value of the pixel is zero. More specifically, this is a verification step for determining the numerical value of the pixel P(m, n) found in step 24.

If the value of the pixel P(m, n) is zero, a number of zero pixel counter is incremented (step 28), the pixel's coordinates are saved in the first layer of the database (step 30) and the value of the pixel is saved in the fourth layer of the database (step 32). The counter incremented in step 28 is generally used to determine the gap between pixels that have a non-zero value.

It is to be noted that when the input image used includes shades of grey, step 26 may be viewed as a comparison between the numerical value of the pixel and a predetermined threshold to determine if this numerical value may be considered as being zero. It is in this case that it is advantageous to save the value of the zero-value pixel in the fourth layer of the database.

The system is then returned to the start of the second loop (step 22) for the next position in the parameter domain.

If the value of the pixel P(m, n) is not zero, a number of non-zero pixel counter is incremented (step 34), the pixel's coordinates m and n are saved in the second layer of the database (step 36) and the numerical value of the pixel is saved in the third layer of the database (step 38). The counter incremented in step 34 is generally used to determine the length of the lines defined by the pixels.

The numerical pixel value is also added to the previous pixel values found (step 40), and the accumulated pixel value is stored in the fifth layer of the database (step 42). The fifth layer of the database is generally used to determine the length of the line defined by the pixels.

When the second and first loops are completed, i.e. when the previously discussed steps have been performed for every position in the parameter domain, the method calls for a third loop that is started in step 44.

Generally stated, the function of the third loop is to recall all the numerical values of non-zero pixels already stored in the third layer of the database in step 38. The third loop is therefore done for each pixel stored in the third layer of the database.

In step 46, the numerical value of the pixel is compared to predetermined value relating to the length of the lines to be detected inputted in step 10. More specifically, the zero pixel and non-zero pixel counters are used to determined the length of the line represented by the third layer cell is within the range determined by the minimum and maximum length of lines to be detected 14.

If it is not the case, the method calls for a return to the third loop if it has not reached its end.

If it is the case, step 48 recalls the stored coordinates of the corresponding pixels in the third layer of the database. Then, in the input image, the numerical values of these pixels will be verified to find endpoints of the corresponding line.

Then, in step 50, by using the stored deterministic parameters of the line and the line endpoints that are found in the precedent step, the detected line will be restored in the output image.

Finally, all the information about extracted lines, such as endpoints, lengths, etc. are stored (step 52) in a new database which is used to generate an output image including the linear features of the corresponding input image.

Features and Operation of the Invention

A global method has therefore been developed so as to be capable of:

detecting and extracting the lines from a digital image with any curvature;

discarding the virtual maxima on the Hough or on the Radon transformed plane;

locating every line segment in the input image (endpoints and length).

Demonstration and Discussion

Figure 2:
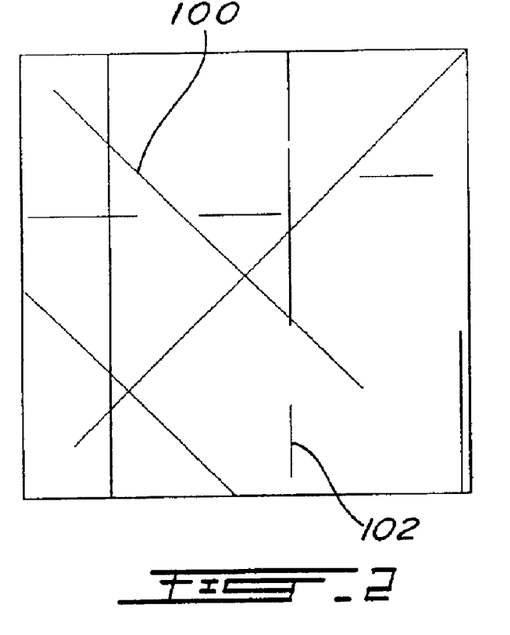
FIG. 2 is an image simulated to showcase the method's ability to extract all lines without consideration for the slope line; extract the lines having a shorter length of the image dimension; and locate extracted lines accurately.

The image of FIG. 2 was simulated to showcase the method's ability to:

i) extract all lines without consideration for the slope line; (for example line 100)

ii) extract the lines having a shorter length than that of the image dimension (for example line 102); and iii) locate extracted lines accurately.

Figure 3:
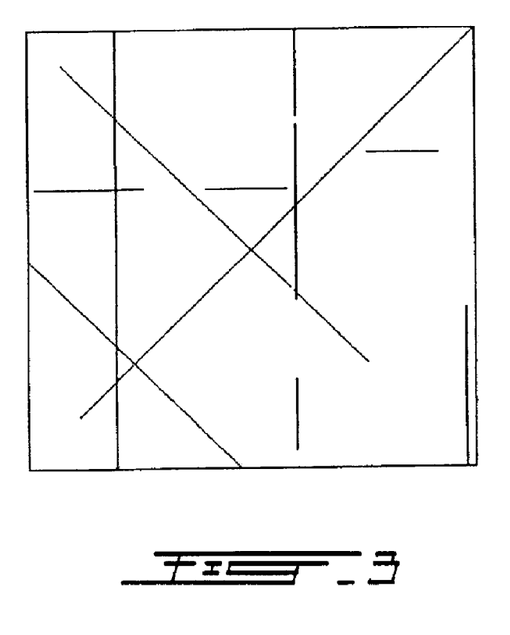
FIG. 3 is an image obtained by applying the implemented algorithm to the image of FIG. 2.

FIG. 3 is an image obtained by applying the above-described method to the image of FIG. 2. The absolute similarity of FIG. 3 with FIG. 2 demonstrates clearly the accuracy of three abilities of the method as described above.

Figure 4:
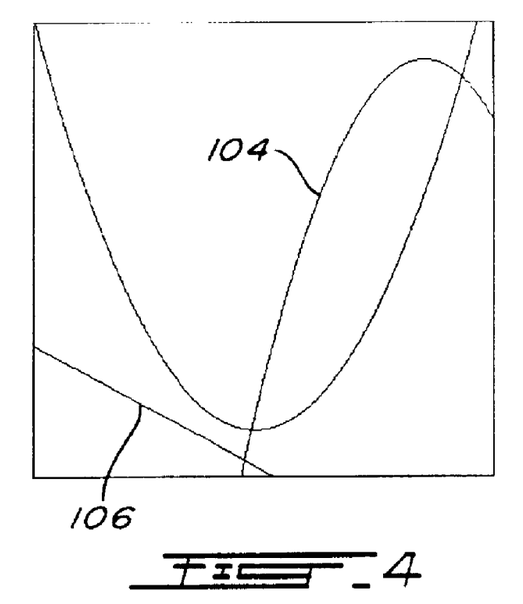
FIG. 4 is an image simulated in order to demonstrate the method's performance in extracting curved as well as straight lines.

The image of FIG. 4 was simulated in order to demonstrate the method's performance in extracting curved (for example line 104 as well as straight lines (for example line 106).

Figure 5:
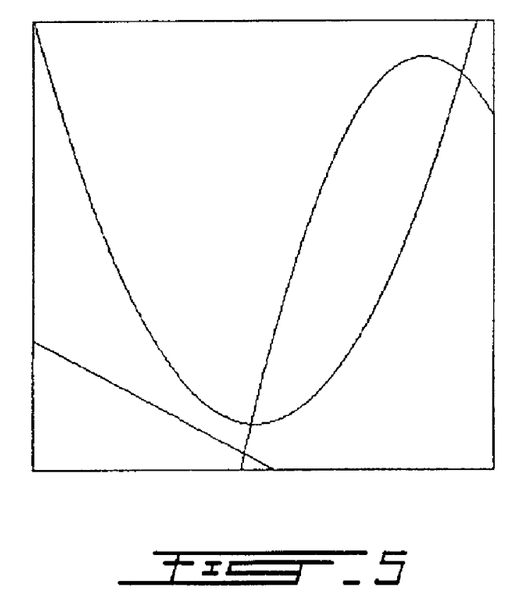
FIG. 5 is an image produced by applying the method of FIGS. 1A and 1B to the image of FIG. 4.

The image illustrated in FIG. 5 was produced by applying the above-described algorithm to the image of FIG. 4. Again, the absolute similarity of FIG. 5 with FIG. 4 demonstrates clearly the accuracy of the method as described above.

As a visual demonstration, a urban road network (see FIG. 6) obtained from a SPOT satellite (from CNES (Centre National d'Études Spatiales) has been selected as an application.

Figure 6:
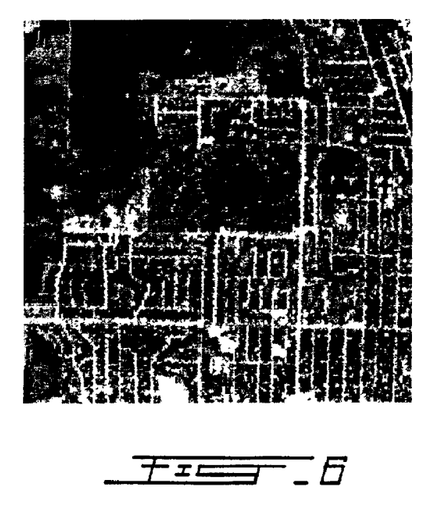
FIG. 6 is a SPOT satellite image of a part of a road map.

The image of FIG. 6 is a part of SPOT satellite image of a road map. The image of FIG. 7 was produced by applying the above-described algorithm to the image of FIG. 6.

Figure 7:
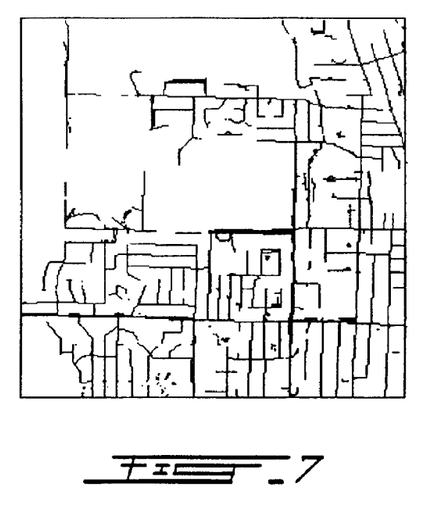
FIG. 7 is an image produced by applying the method of FIGS. 1A and 1B to the image of FIG. 6.

A comparison of the images of FIGS. 6 and 7 reveals that the restrained roads in the input image have been extracted in detail and with high geometric precision.

Figure 8:
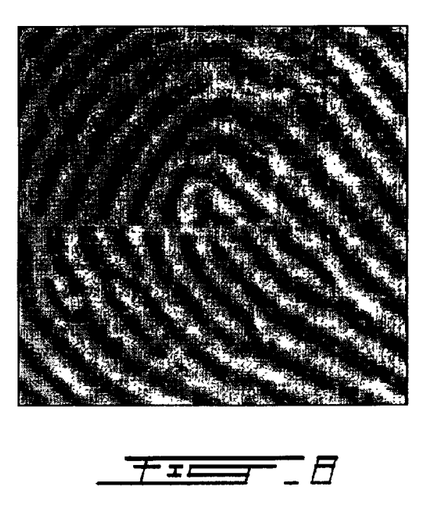
FIG. 8 is a scanned image of a part of a fingerprint.
Figure 9:
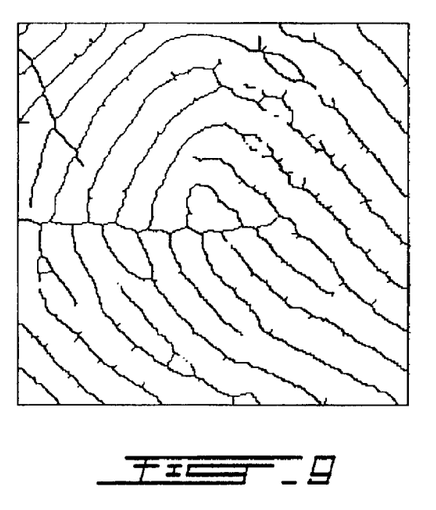
FIG. 9 is an image produced by applying the method of FIGS. 1A and 1B to the image of FIG. 8.

Turning now briefly to FIGS. 8 and 9 of the appended drawings, another application of the method and system of the present invention will be described. FIG. 8 illustrates a portion of a scanned fingerprint. On the other hand, FIG. 9 illustrates the output image when the input image is FIG. 8. As will be apparent to one skilled in the art, the output image of FIG. 9 could be used in a fingerprint identification system.

Figure 10:
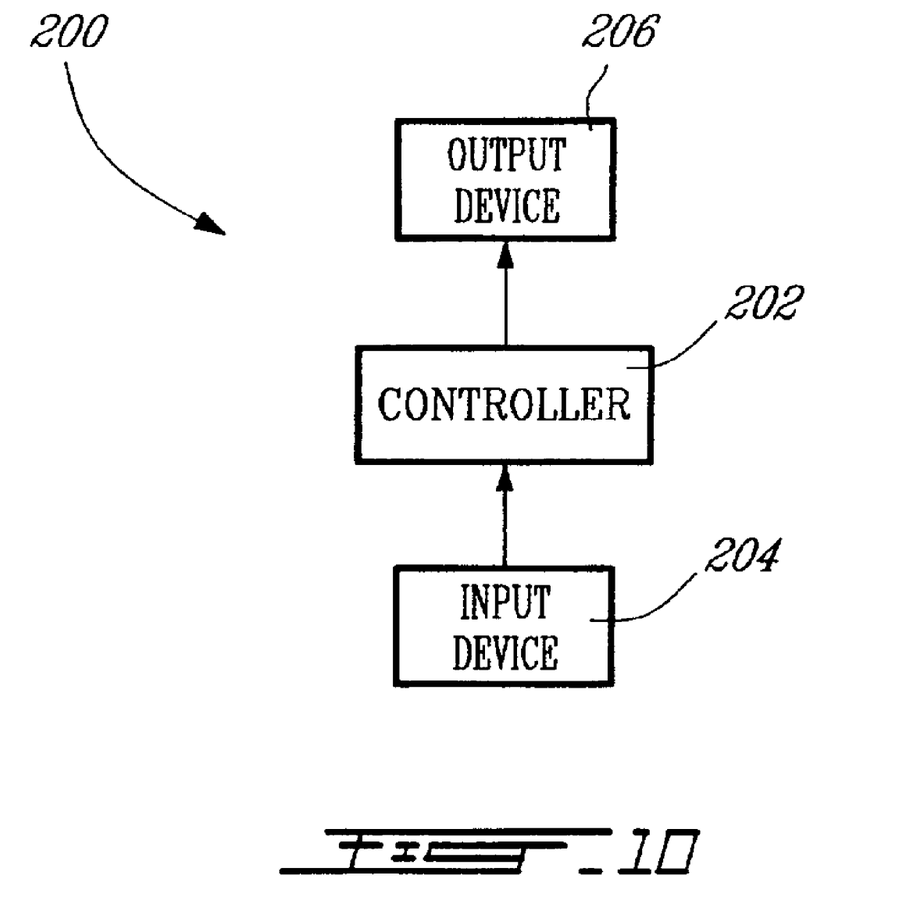
FIG. 10 schematically illustrates a system according to an embodiment of the present invention.

Finally, FIG. 10 of the appended drawings schematically illustrates a system 200 for the extraction of linear features from an input image. The system 200 includes a controller 202, for example in the form of a personal computer (not shown) that is so designed to run a computer program embodying the method described hereinabove. The controller 202 therefore includes the multi-layer database.

The system 200 also includes an input device 204, for example in the form of a scanner (not shown) or of a link to another computer containing the input image (not shown) accessible through a computer network.

An output device 206 is also provided to output the image. This output device may be in the form of a printer (not shown), a computer monitor (not shown) or of a link to another computer configured to receive the output image (not shown) accessible through a computer network.

The method and system of the present invention are advantageous since they provide for the automatically extraction of line features and provide accurate, acceptable results. Furthermore, the method of the present invention is advantageous since it can extract curved lines of any length with a high degree of accuracy. Our method identifies every line or line segment, labeling its length, its curvature, and endpoint coordinates in a database. Moreover, the database can be easily integrated into any geographic or spatial information system.

Examples of Fields of Applications

The method and system of the present invention is of broad interest and make a general contribution to the field of pattern recognition and digital image processing, regardless of the nature or source of the digital image. It could be used in a vast number of fields and application, of which the following are a sampling.

In the field of remotely sensed imagery, the method and system of the present invention could be used for the extraction and update of road maps; for planimetric cartography, geology, and hydrology; for mapping powerlines, pipelines, and railways; and for tracking cycle trails, ORV trails, and the like, for example.

In the field of medical imagery, the method and system of the present invention could be used for the detection of arteries, blood vessels, tumors, for example.

In the field of imagery from other sources, the method and system of the present invention could be used for electrical circuits and the like.

As will be apparent to one skilled in the art, even though the method has been presented herein with a single multilayer database, it could also be implemented with a number of databases each representing a layer described hereinabove. The expression "database layer" is therefore to be construed as also meaning a separate database.

Furthermore, the method and system of the present invention may be used on binary and "greyscale" images.

Although the present invention has been described hereinabove by way of preferred embodiments thereof, it can be modified, without departing from the spirit and nature of the subject invention as defined in the appended claims.

References

[1] Wang, D., He, D.-C., Wang, L., et Morin, D. (1996) L'extraction du réseau routier urbain à partir d'images SPOT HRV. INT. J. Remote Sensing, vol.17, n°. 4, p. 827–833.

[2] Groch, W. D. (1982) Extraction of Line Shaped Objects from Aerial Images using a Special operator to analyse the Profiles of Functions. Computer Graphics and Image Processing, vol.18, p. 347–358.

[3] Lacroix, V., et Acheroy, M. (1998) Feature extraction using the constrained gradient. ISPRS Journal of Photogrammetry and Remote Sensing, vol.53, p. 85–94.

[4] Nevatita, R. et Babu, K. R. (1980) Linear Feature Extraction and Description. Computer Graphics and Image Processing, vol.13, p. 257–269.

[5] Schanzer, D., Plunkett, G. W. et Wall. Da. (1990) Filters for Residential Road Delineation from SPOT LPA Imagery. GIS FOR 1990s, 801, Conference Proceedings.

[6] Ton, J. (1989) Automatic Road Identification and labelling in Landsat 4 TM Images. Photogrammetria, vol.43, n°.5, p. 257–276.

[7] Wang, J. F., Treitz, P. M., et Howarth, P. J. (1992) Road network detection from SPOT imagery for updating geographical information systems in rural-urban fringe. Geographical Information Systems, vol.6, n°2, p. 141–157.

[8] Wang, J. F., et Howarth, P. J. (1987) Methodology for Automated Road Network Extraction from Landsat TM Data. Proc. Ann ASPRS/ACSM Convention (Baltimore, Md.), vol.1, p. 429–438.

[9] Wang, J. F., et Liu, W. (1993) Evaluation of Road Detection Methods Using Multi Band remote sensing Images. Canadian Symposium on Remote Sensing, 16th, L'AQT/CRSS.

[10] Destival, I. et Men, H. L. (1986) Detection of Linear Networks on Satellite Images. Photogrammetric Engineering and Remote Sensing, vol.54, n°. 10, p. 1551–1555.

[11] Ferrand, R., et Marty, H. M. (1985) Computer Processing Test on a Simulated SPOT Image of Toulouse (France). Photo-Interpretation, vol.3, p. 39–45.

[12] O'brien, D. (1988) Automatic extraction of road networks from digital imagery. Proceeding of the International Symposium on Topographic Applications of SPOT Data, October 13–14, (Sherbrooke, Quebec, Canada; Canadian Institute of Surveying and Mapping), p.273–287.

[13] Peters, R. A. (1995) A New Algorithm for Image Noise Reduction Using Mathematical Morphology. Transactions on image processing, vol.4, n°. 5, p. 554–568.

[14] Voiron, Ch. (1995) Analyse spatiale et analyse d'image. Montpellier, GIP RECLUS, p.190.

[15] Chittineni, C. B. (1983) Edge and Line Detection on Multidimensional Noisy Imagery Data. IEEE Transaction on Geoscience and Remote Sensing, GE-21(2), p. 163–174.

[16] Cleynenbreugel, J. V., et al. (1990) Delineating Road Structures on Satellite Imagery by a GIS-guided Technique. Photogrammetric Engineering and Remote Sensing, vol.56, p. 893–893.

[17] Wang, F., et Newkirk, R. (1988) Knowledge-Based System for Highway Network Extraction. IEEE Transaction on Geoscience and Remote Sensing, vol.26, n° 5, p. 525–531.

[18] Yee, B. (1987) An Expert System for Planimetric Feature Extraction. Processing of IGARSS 87, Ursi, Ann Arbor, Mich., p. 321–325.

[19] Farah, Noureddine. (1998) Extraction et évaluation du réseau routier urbain à partir des images satellitaires: développement d'algorithmes. Mémoire de maîtrise, Université de Sherbrooke, Sherbrooke, 112 p.

[20] Jedynak, Bruno. (1995) Modèles stochastiques et méthodes déterministes pour extraire les routes des images de la Terre vues du ciel. Thèse de doctorat. Université Paris Sud, UFR de mathématiques. 185 p.

[21] Copeland, A. C., Ravichandran, G. et Trivedi, M. M. (1994) Localized Radon Transform-Based Detection of Linear Features in Noisy Images. Proc. IEEE Conf. On Computer Vision and Pattern Recognition, Seattle, Wash., Juin 1994, p. 664–667.

[22] Duda, R. O. et Hart, P. E., (1972) Use of the Hough Transformation to Detect Lines and Curves in Pictures. Comm. ACM, 15(1), p. 11–15.

[23] Murphy, L. M., (1986) Linear Feature Detection and Enhancement in Noisy Images Via the Radon Transformation. Pattern Recognition Letters, 4(4), p. 279–284.

[24] Rey, M. T. et al., (1990) Application of Radon Transform Techniques to Wake Detection in Seasat-A SAR Images. IEEE Trans. Geosience and Remote Sensing, 28(4), p. 553–560.

[25] Karnieli, A. et al., (1996) Automatic Extraction and Evaluation of Geological Linear Features from Digital Remote Sensing Data Using a Hough Transform. Photogrammetric Engineering & Remote Sensing, Vol. 62, No. 5, May 1996, pp. 525–531.

[26] Toft, P. (1996) The Radon Transform, Theory and Implementation. These de doctorate, Department of Mathematical Modelling, Section for Digital Signal Processing, Technical University of Denmark, 308 p.

[27] Wang, J. F. (1993) LINDA—A System for Automated Linear Feature Detection and Analysis. Canadian Journal of Remote Sensing, vol.19, n° 1, p. 9–21.

What is claimed is:

1. A method for extraction of linear features from digital imagery, comprising the steps of:
   providing a digital image;
   providing a multi-layer database;
   initializing a parameter domain;
   successively applying a Radon transform on each position in the parameter domain;
   for each position in the parameter domain:
      finding coordinates of a nearest pixel in the digital image;
      determining a numerical value of the nearest pixel; and
      populating layers of the multi-layer database in accordance with the numerical value of the nearest pixel;
   analysing data of the multi-layer database for linear features; and
   generating an output image by restoring the detected linear features;
   wherein said step of providing a multi-layer database includes providing a multi-layer database having at least five layers; a first layer used to contain coordinates of zero value pixels; a second layer used to contain coordinates of non-zero value pixels; a third layer used to contain values of the non-zero value pixels; a fourth layer used to contain values of the zero value pixels, and a fifth layer used to contain an accumulation of the non-zero pixel values.

2. The method for the extraction of linear features as recited in claim 1, wherein, said step of populating the layers of the multi-layer database comprises:
   storing the coordinates of the nearest pixel in the first layer when the numerical value of the nearest pixel is found to be below a predetermined threshold;
   storing the coordinates of the nearest pixel in the second layer when the numerical value of the nearest pixel is found to be above the predetermined threshold;
   storing a numerical value of pixels having a value which is above the predetermined threshold in the third layer;
   storing a numerical value of pixels having a value which is below the predetermined threshold in the fourth layer; and
   storing an accumulation of the numerical value of pixels that have a numerical value which is above the predetermined threshold in the fifth layer.

3. The method for the extraction of linear features as recited in claim 1, wherein said step of analysing the data of the multi-layer database includes the substep of finding endpoints of each linear feature to be extracted.

4. The method for the extraction of linear features as recited in claim 3, further comprising the step of storing the endpoints found in a database used in said step of generating the output image.

5. The method for the extraction of linear features as recited in claim 1, further comprising the step of providing a minimum and a maximum length of the linear features to be detected.

6. A system for extraction of linear features from a digital image and for generating a corresponding output image, comprising:
   a controller provided with an input designed to receive a digital image and an output designed to provide a corresponding output image; said controller containing a multi-layer database; said controller being so configured as to:
      initialize a discrete parameter domain;
      successively apply a Radon transform on each position in the parameter domain;

for each position in the parameter domain:
    find coordinates of a nearest pixel in the digital image;
    determine a numerical value of the nearest pixel; and
    populate layers of the multi-layer database in accordance with the numerical value of the nearest pixel;
analyse data of the multi-layer database to detect linear features; and
generate an output image by restoring the detected linear features;
wherein the multi-layer database includes at least five layers: a first layer used to contain coordinates of zero value pixels; a second layer used to contain coordinates of non-zero value pixels; a third layer used to contain values of the non-zero value pixels; a fourth layer used to contain values of the zero value pixels, and a fifth layer used to contain an accumulation of the non-zero pixel values.

7. The system for the extraction of linear features as recited in claim 6, wherein, when populating the layers of the multi-layer database, the controller is so configured as to:
    store the coordinates of the nearest pixel in the first layer when the numerical value of the nearest pixel is found to be below a predetermined threshold;
    store the coordinates of the nearest pixel in the second layer when the numerical value of the nearest pixel is found to be above the predetermined threshold;
    store a numerical value of pixels having a value which is above the predetermined threshold in the third layer;
    store a numerical value of pixels having a value which is below the predetermined threshold in the fourth layer; and
    store an accumulation of the numerical value of the pixels that have a numerical value which is above the predetermined threshold in the fifth layer.

8. The system for the extraction of linear features as recited in claim 6, further comprising an output device connected to said output of said controller to receive the output image generated by said controller.

9. The system for the extraction of linear features as recited in claim 6, further comprising an input device connected to said input of said controller to supply the digital image to the controller.

* * * * *

UNITED STATES PATENT AND TRADEMARK OFFICE
CERTIFICATE OF CORRECTION

PATENT NO. : 6,928,189 B2
DATED : August 9, 2005
INVENTOR(S) : Gholamabbas Hemiari, Denis Morin and Dong-Chen He It is certified that error appears in the above-identified patent and that said Letters Patent is hereby corrected as shown below:

Title page,
Item [54], Title, should read -- SYSTEM AND METHOD FOR THE AUTOMATIC EXTRACTION OF LINEAR FEATURES FROM DIGITAL IMAGERY --.
Item [73], Assignee, should read -- Université De Sherbrooke --.

Signed and Sealed this

Eleventh Day of October, 2005

JON W. DUDAS
*Director of the United States Patent and Trademark Office*